United States Patent [19]
Rao

[11] Patent Number: 5,930,358
[45] Date of Patent: Jul. 27, 1999

[54] STORAGE DEVICE HAVING A NONVOLATILE MEMORY FOR STORING USER CHANGEABLE OPERATING PARAMETERS

[75] Inventor: Mahesh Chandra Rao, San Jose, Calif.

[73] Assignee: Mitsubishi Chemical America, Inc., White Plains, N.Y.

[21] Appl. No.: 08/816,893

[22] Filed: Mar. 13, 1997

Related U.S. Application Data

[62] Division of application No. 08/561,930, Nov. 22, 1995, Pat. No. 5,812,883.

[51] Int. Cl.⁶ .............................. H04L 9/00; G06F 9/312
[52] U.S. Cl. .................... 380/4; 380/23; 380/25; 380/49; 380/50; 380/59; 395/186; 710/74; 360/133
[58] Field of Search ........................ 380/4, 23, 25, 380/52, 59, 49, 50; 395/186, 187.01, 188.01; 348/10, 734; 369/58; 280/5, 522; 360/104, 48, 133; 345/511; 711/161; 386/52, 55; 396/647; 710/74

[56] References Cited

U.S. PATENT DOCUMENTS

| | | |
|---|---|---|
| 4,494,156 | 1/1985 | Kadison et al. . |
| 4,675,755 | 6/1987 | Baumeister et al. . |
| 4,703,359 | 10/1987 | Rumbolt et al. . |
| 4,796,099 | 1/1989 | Compton . |
| 4,811,279 | 3/1989 | Bean et al. . |
| 4,862,295 | 8/1989 | Tanaka et al. . |
| 4,979,055 | 12/1990 | Squires et al. . |
| 5,058,164 | 10/1991 | Elmer et al. ............................. 380/50 |
| 5,229,901 | 7/1993 | Mallary . |
| 5,263,136 | 11/1993 | DeAguiar et al. . |
| 5,265,230 | 11/1993 | Saldanha et al. . |
| 5,274,807 | 12/1993 | Hoshen et al. . |
| 5,276,558 | 1/1994 | Hanson . |
| 5,287,407 | 2/1994 | Holmes ..................................... 380/4 |
| 5,293,601 | 3/1994 | Tsuyuguchi et al. . |
| 5,309,420 | 5/1994 | Jaquette et al. . |
| 5,333,277 | 7/1994 | Searls . |
| 5,341,166 | 8/1994 | Garr et al. . |
| 5,357,614 | 10/1994 | Pattisam et al. . |
| 5,412,519 | 5/1995 | Buettner et al. . |
| 5,452,277 | 9/1995 | Bajorek et al. . |
| 5,453,736 | 9/1995 | Noren . |
| 5,485,409 | 1/1996 | Gupta et al. ............................ 395/186 |
| 5,563,748 | 10/1996 | Hanson . |
| 5,584,023 | 12/1996 | Hsu . |
| 5,600,394 | 2/1997 | DeCook et al. . |

OTHER PUBLICATIONS

Robert Cowart, "Mastering Windows 3.1" (special edition); (Sybex Inc.; San Francisco; 1992); p. 142.

*Primary Examiner*—Bernarr E. Gregory
*Attorney, Agent, or Firm*—Oblon, Spivak, McClelland, Maier & Neustadt, P.C.

[57] ABSTRACT

A storage device or drive such as a disk or tape drive including a nonvolatile erasable semiconductor memory which stores parameters which control the operation of the storage device. Through a user interface on a host computer, the user is capable of changing the parameters which are used to control the storage device, allowing the user to configure the operation of the storage device in any manner desired. The parameters which are changeable within the storage device relate to responses to the detection of errors within the storage device, data encryption algorithms, the stopping of a disk from spinning, the caching of the storage device, and data compression algorithms. The storage drive also has the capability to perform a stand-alone formatting operation. After formatting a storage medium with the assistance of the host computer, the formatted medium is read by the drive and stored in the nonvolatile memory of the storage drive. The next time a medium needs to be formatted, the formatting information is read from the memory of the storage drive to perform the formatting, thus freeing the host computer to perform other tasks.

40 Claims, 12 Drawing Sheets

STORAGE DEVICE HAVING A NONVOLATILE MEMORY FOR STORING USER CHANGEABLE OPERATING PARAMETERS

CROSS-REFERENCES TO RELATED APPLICATIONS

The present application is a Divisional of U.S. application Ser. No. 08/561,930 filed Nov. 22, 1995, now U.S. Pat. No. 5,812,883. The application is also related to commonly owned U.S. patent application Ser. No. 08/317,642 filed Sept. 30, 1994 entitled "Intelligent Peripheral Controller", which is incorporated herein by reference now U.S. Pat. No. 5,640,592.

BACKGROUND OF THE INVENTION

1. Field of the Invention

The present invention relates to a storage device such as a disk or tape drive which has an erasable nonvolatile memory for storing parameters and/or microcode used to control the storage device. The invention is more particularly related to a storage drive having a nonvolatile semiconductor memory such as a flash memory which stores operating parameters and microcode which are changeable by a user and control the operation of the storage device.

2. Discussion of the Background

Conventional storage drives such as disk drives and tape drives have the microcode used to control the operation of the drive fixed by the drive manufacturer. This does not permit any changes to be made in the way the storage drive operates by the end user.

Some newer storage drives include a changeable nonvolatile memory such as a flash memory which stores the microcode for controlling the operation of the drive. If there are defects found to exist within the microcode, the user may execute a program to load a new version of the microcode into the flash memory. The new version of the microcode can be mailed to a user on a floppy disk or the user may download the new version of microcode via a modem or other manner of remotely communicating with a bulletin board set up by the drive manufacturer or group of computer users. However, these conventional systems do not permit a user to control the manner in which the drive operates.

SUMMARY OF THE INVENTION

Accordingly, it is the object of the invention to provide a novel storage drive such as a disk or tape drive including a changeable nonvolatile memory for storing operating parameters which may be altered by an end user.

It is a further object of the invention to provide a peripheral controller and/or peripheral device having parameters stored in a nonvolatile memory which are changeable using a graphical user interface of a host computer.

It is yet another object of the invention to provide a storage drive in which the end users can change operating parameters including operating parameters relating to the handling of defects of the storage device, parameters pertaining to the encryption of data, parameters pertaining to the spin down of the storage drive, parameters relating to the caching of information with the storage drive, and parameter pertaining to the compression of data.

It is a further object of the invention to provide a storage drive having the capability to perform a stand-alone formatting operation on a storage medium therein.

These and other objects are accomplished by a storage drive assembly having a nonvolatile memory for storing a parameter used to control the execution of a utility algorithm within the storage drive. The storage drive will initially have default parameters for controlling the storage drive programmed in the erasable non-volatile memory. The user can freely alter these parameters in order to custom-tailor the operation of the storage drive as he or she desires. New or updated utility algorithms may be transferred to the storage drive as needed or as they become available. The nonvolatile memory can be implemented as a flash memory, an EPROM, an EEPROM, or CMOS RAM.

Typically, during the operation of the storage drive, the parameters for controlling the operation of the storage drive are changed by a utility program executing in a computer connected to the storage drive. The parameters can be changed without changing the control programs themselves. The various parameters which are stored in the non-volatile memory indicate if a stored utility algorithm is to be executed, which one of a plurality of utilities performing the same function is to be executed, or how the utility algorithms are to operate.

A set of parameters utilized by the present invention controls how errors are processed within the storage device. As an example, the user can set the number of errors which are permitted to occur within the storage drive before the storage drive is marked write protected. Also, the types of errors which are monitored can also be altered by changing the appropriate parameters.

Another set of parameters utilized by the invention pertains to the encryption and decryption of data within the storage device. The user can select parameters indicating whether encryption or decryption is performed, the specific utility algorithm which is to perform the encryption and decryption, a seed used by the encryption and decryption process, or any other parameter for controlling encryption and decryption. If desired, the seed stored within the nonvolatile memory may be deleted or erased when power to the computer system is turned off.

Another set of parameters utilized by the present invention and stored within the non-volatile erasable memory control a spin down process of the storage device. The parameters indicate whether or not the spin down process is to occur and the amount of time which must elapse without any disk activity before the rotation of the disk is stopped or slowed.

Other parameters utilized by the invention control whether or not caching is to be performed and the manner in which the caching process operates, and whether compression of data on the storage medium is to be performed and the manner of performing the data compression.

Another feature of the invention is the capability to perform stand-alone formatting of a storage medium within the storage drive. Initially, the user formats a storage medium such as a removable disk using the operating system within the host computer. After the formatting process is complete, the user indicates that the formatted storage medium is to serve as a master storage medium. The storage drive reads all information off of this newly formatted disk to determine the structure of the formatted disk. This information is then written into a nonvolatile memory within the storage drive. If there is more information on the storage medium than can be stored in the nonvolatile memory, an error message is displayed to the user.

After the formatting information is written into the non-volatile memory, subsequent formatting of storage media may be performed without tying up the resources of the host computer. After placing a new unformatted storage medium with the storage drive, the user indicates that a stand-alone formatting process is to be performed. This may be accomplished by pressing one or more buttons on the storage drive or a stand-alone command may be given through the host computer. If the stand-alone processing is initiated by pressing one or more buttons on the storage drive, the input device on the storage drive will be constructed so that the storage medium cannot be accidentally formatted, resulting in a disk containing stored data from being improperly overwritten. After the user inputs the command indicating the stand-alone formatting is to be performed, the nonvolatile memory is examined to determine if it has the appropriate formatting information. If the formatting information exists within the nonvolatile memory, the stand-alone formatting is performed without tying up the resources of the host computer. If the stand-alone memory does not contain the necessary information, an error message is displayed to the user.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
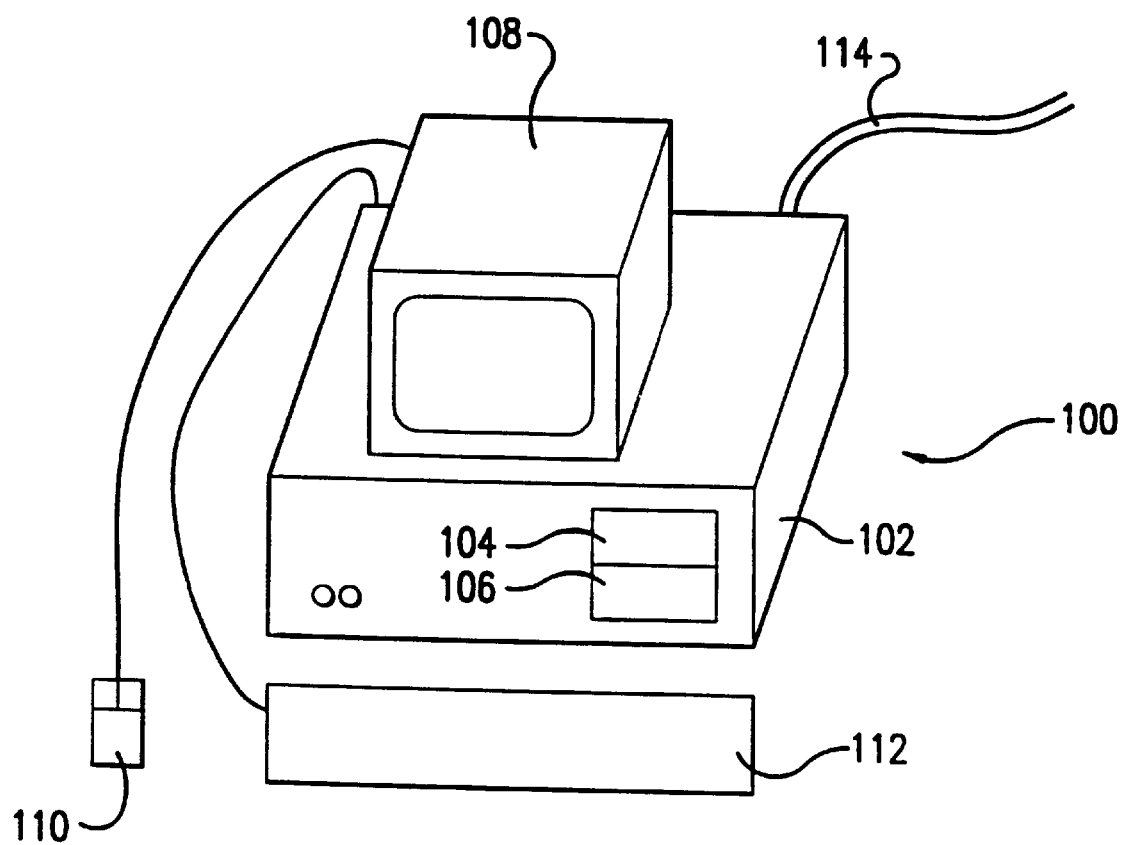
FIG. 1 illustrates a general purpose computer embodying a storage drive constructed in accordance with the present invention.
Figure 2:
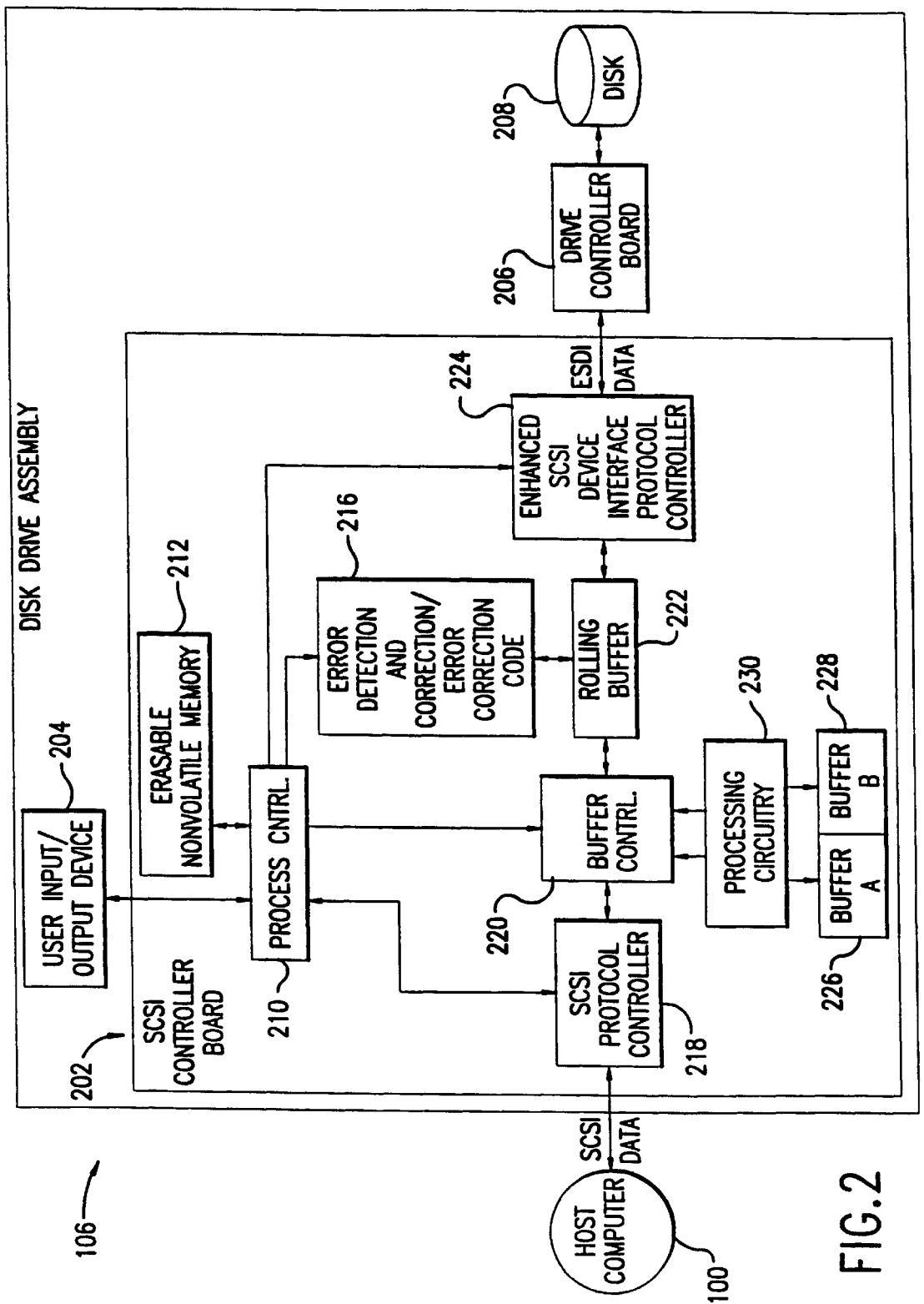
FIG. 2 illustrates a disk drive assembly used with the computer illustrated in FIG. 1.

Referring now to the drawings, wherein like reference numerals designate identical or corresponding parts throughout the several views, and more particularly to FIG. 1 thereof, there is illustrated a computer 100, referred to as a host computer, including a storage drive assembly 106 constructed according to the present invention. The host computer is defined to be any type of computer which connects to a peripheral device. The computer 100 includes a central processing unit 102 which includes the necessary conventional components which are found in a personal computer such as an IBM compatible personal computer including a power supply, a microprocessor, RAM, ROM, and any other conventional components which are necessary. The CPU 102 includes a first peripheral device 104 such as a floppy disk drive, an optical disc, a tape drive, or any other peripheral device. There is also the storage drive assembly 106 which is illustrated in FIG. 2 as a disk drive assembly and discussed in detail below. However, the storage drive assembly can be any type of storage device such as a tape drive or any type of disk drive. The computer 100 further includes a monitor 108, a pointing device such as a mouse 110, and a keyboard 112. The CPU includes a modem (not illustrated) connected to a phone line 114 which is used for downloading new microcode used to control the disk drive assembly 106. Alternatively, new control algorithms are transferred to the disk drive assembly using a floppy disk.

FIG. 2 illustrates the details of the disk drive assembly 106. The disk drive assembly 106 contains a SCSI controller board 202, a user input/output device 204, a drive controller board 206, and a disk 208. The host computer 100 communicates with the disk drive assembly 106 by exchanging SCSI data with the SCSI controller board 202.

The SCSI controller board 202 is connected to the host computer 100 through a SCSI cable having the appropriate connectors for attachment to the host computer and disk drive assembly. The SCSI controller board 202 controls the high level operations of the disk drive assembly while the drive controller board controls the low level tasks. The low level tasks controlled by the drive controller board 206 pertain to the physical operation of the disk drive including positioning of the disk drive head and electrical signals to the disk drive head used to read or write information, for example. Other commands which do not directly pertain to the rudimentary control and positioning of the disk heads, disk speed, etc., are considered high level commands and are processed by the SCSI controller board 202.

The user input/output device 204 is any device for inputting commands to the disk drive assembly including one or more dip switches, a rotary switch having a plurality of settings, a keypad, a keyboard, a pointing device such as a mouse or any other type of device through which a user of the disk drive assembly makes various selections or enters commands. The user input/output device 204 also includes one or more pushbuttons which for commanding the storage drive to perform a stand-alone formatting operation. The commands which the user inputs depend on the features of the peripheral device and the utility algorithm(s) stored within the peripheral device. In a variation of the invention, the user may select an emulation of the disk drive assembly (e.g., whether the disk drive assembly is to operate the disk inside as a Macintosh disk, an IBM disk, etc.). The user is able to begin, suspend, and modify the execution of a utility such as the stand-alone formatting process using the user input/output device 204 or the host computer. The output which is provided by the user input/output device 204 includes a visual output such as illumination of an LED to indicate a status of the disk drive assembly, or a more sophisticated display such as a liquid crystal display which provides the user with a simple indication or more advanced alpha-numeric information regarding the state of the disk drive assembly. The input/output device 204 includes an audio output device if the user desires an audible indication of the status of the disk drive and/or a process executing therein. For example, a speaker or other sound generator may beep when a formatting process is complete, in addition to a visual output provided by the device 204 indicating that the formatting is complete.

The SCSI controller board 202 contains a process controller 210 which oversees control of the disk drive assembly. Incoming data from the host computer 100 and outgoing data to the host computer 100 pass through the SCSI protocol controller 218. Controller 218 separates the SCSI protocol data which essentially defines the format and handshaking protocols from the other useful data used by the disk drive assembly. A buffer controller 220 controls the movement of data within the SCSI controller board to and from the host computer 100 and the disk 208. The buffer controller 220 directs incoming data from buffer A 226 while previously stored data in buffer B 228 is forwarded to a rolling buffer 222. After buffer B 228 is empty, incoming data from the host computer 100 is directed by the buffer controller 220 to buffer B 228 while buffer A 226 transfers data therein to rolling buffer 222. The rolling buffer 222 contains two or three buffers. The data sent to the rolling buffer 222 is stored in one of the buffers thereof and transferred or monitored by the error detection and correction/error correction code ("EDAC/ECC") device 216 which detects any errors and corrects them as necessary. The enhanced SCSI device interface protocol controller ("ESDI/PC") changes the format of data from the SCSI controller board to be compatible with the drive controller board 206 and vice versa. Commands which are issued to and processed by the drive controller board relate to primitive disk commands such as head movement and head read/write status in order to write to and read from the disk 208.

Erasable nonvolatile memory 212 is a semiconductor memory device such as a flash memory, EPROM, EEPROM, CMOS RAM with a battery back-up, or any other type of nonvolatile memory which stores information after power is turned off to the disk drive assembly 200 and can be written to a plurality of times. The memory 212 is easily updated with new algorithms and allows for the changing of parameters and variables therein without physically substituting memory chips constituting the memory 212. The erasable nonvolatile memory 212 stores firmware which is the logic for controlling the operation of the SCSI controller board 202 in addition to the utility algorithms and the parameters. A utility or utility algorithm is any program used to control or enhance the operation or function of the disk drive assembly and is synonymous with a control program. The nonvolatile memory 212 is illustrated as one element but a variation of the invention has this memory implemented using a plurality of memories. As in conventional systems, new versions of code can be transferred to the memory 212. Also, completely new utilities and algorithms may be transferred to the memory 212 from to the host computer through the process controller 10, buffer controller 220, and SCSI protocol controller 218.

In the present invention, power is supplied to each of the elements illustrated in FIG. 2 in a conventional manner using either a battery, an alternating current source, a direct current power source, or any other type of power source.

Processing circuitry 230 is located between the buffer controller 220 and buffers A and B, 226 and 228 respectively. The processing circuitry 230 includes a general purpose microprocessor which executes various algorithms which are stored in the erasable nonvolatile memory 212. This microprocessor will require a memory for execution of the algorithm such as a random access memory which is conveniently implemented as buffer A 226 or buffer B 228. As an alternative or in addition to using the buffers 226 and 228 with the microprocessor, the processing circuitry will have its own random access memory. As a variation, instead of or in addition to the processing circuitry including a general purpose microprocessor which executes a utility algorithm stored within the erasable nonvolatile memory 212, the processing circuitry is special purpose circuitry constructed to execute the functions of the desired utility algorithm(s) using parameters or other information stored in the erasable nonvolatile memory 212. The size of the buffers A and B or random access memory used by the processing circuitry will constrain the power and efficiency of the algorithms performed by the processing circuitry 230. For this reason, when it is desired to increase the efficiency or capabilities of the processing circuitry and cost is not an overriding factor, it will be desired to increase the size of the random access memory used by the processing circuitry 230. If desired, the process controller 210 and processing circuitry 230 are implemented using the same processing circuitry.

The specific structure of the disk drive assembly is not limited to the illustration of FIG. 2 but any type of circuitry within a peripheral device may be utilized as long as the circuitry is capable of executing the desired algorithm. When flexibility is a desired feature for the functions of the disk drive assembly, the erasable nonvolatile memory 212 and/or processing circuitry 230 will be contained on a device which is easily connectable to and removable from the disk drive and contained on a plug-in device such as a PCMCIA card or any other plug-in device.

The storage drive has default settings stored in the erasable nonvolatile memory 212 which are programmed by the manufacturer of the storage drive. The drive will operate in accordance with these default settings or parameters until the user changes the parameters. When the settings have to be changed, a software utility will be executed in the host computer which interacts with a user and allows the user to change the parameters controlling operation of the storage drive and allows new programs to be written to the erasable nonvolatile memory 212.

The software utility can be implemented to have a graphical user interface which operates in a windows environment using programming skills possessed by one of ordinary skill in the computer art. The software utility will allow the user to alter the operating parameters stored in the erasable nonvolatile memory 212 in order to change the operation of the storage drive.

The present invention may also be configured in a similar manner as the "control panel" of the Microsoft windows environment so that the user can select the model and manufacturer of the disk drive and easily change the operating parameters. Once the parameters are changed, the drive will continue to utilize the same settings until again changed. These settings will not change, even if the power is turned off or the computer is reset, with one exception which is described below in the explanation of the encryption process performed by the invention.

Figure 3:
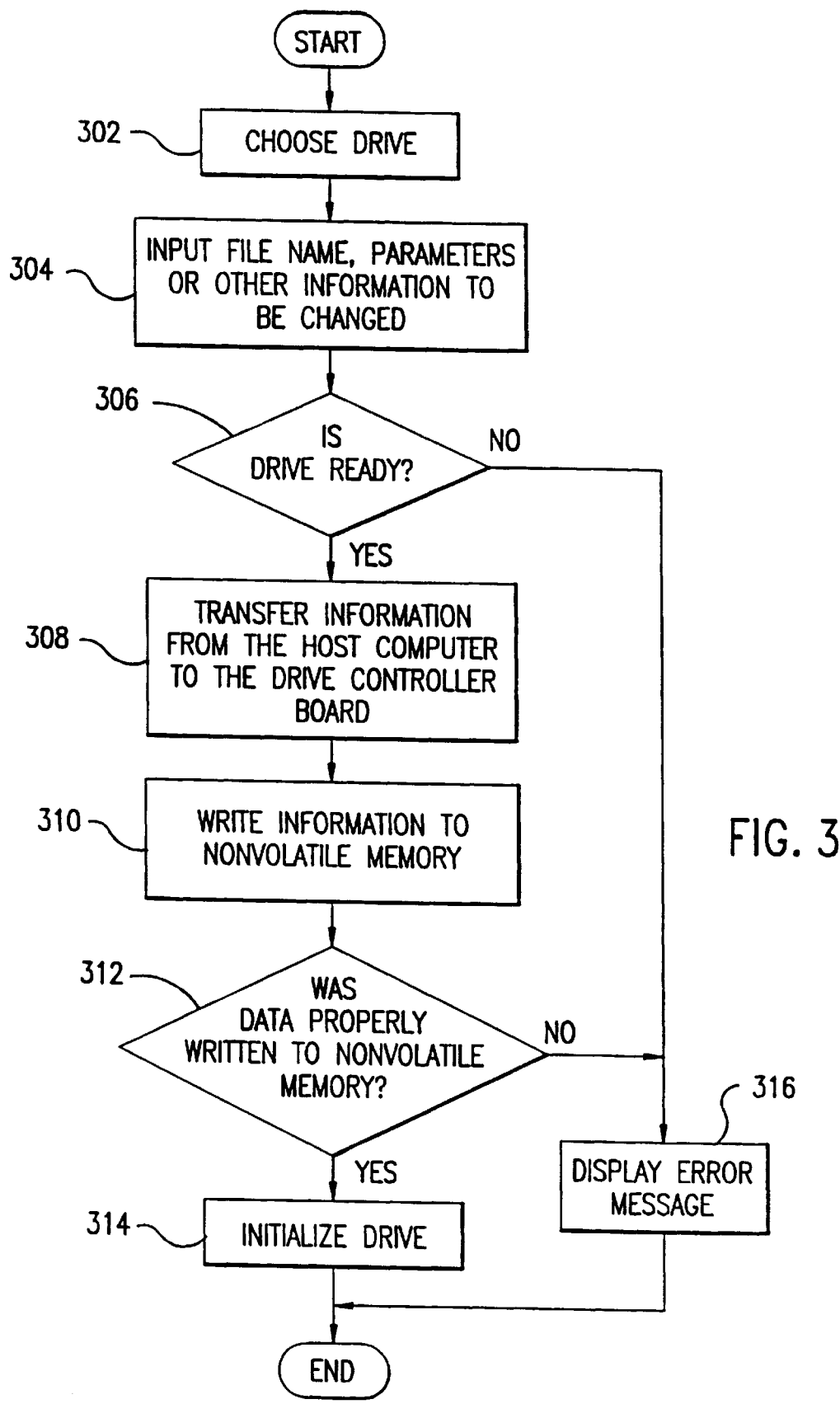
FIG. 3 illustrates a flowchart showing the general process of changing information contained within an erasable nonvolatile memory of a controller board of the storage drive.

FIG. 3 is a flowchart which illustrates the general process of changing the parameters used to control the storage drive. This process is executed within the host computer in conjunction with the storage drive assembly. After starting, the user chooses the drive for which the parameters are to be altered in step 302. Next, the user enters the information which controls the storage drive which is to be changed. If this information is organized in files within the erasable nonvolatile member 212, the user will select the desired file name. The parameters or any other information used to control the operation of the storage drive assembly are input by this step. Next, step 306 determine if the storage drive is ready. If the drive is ready, step 308 transfers the input information from the host computer to the storage drive controller board. This information is then written into the erasable nonvolatile memory within the storage drive controller board. Step 312 determines if the parameters and information were properly written into the nonvolatile memory. An error message is displayed if the information was not properly written or if the drive was not determined to be ready in step 306. If the information was determined to be properly written in step 312, the drive is initialized in order to be able to use the changed information and the process of FIG. 3 ends.

An important feature of the present invention is the changing of individual parameters used to control the operation of the utility programs executed by the storage drive. For example, different algorithms may be stored in the erasable nonvolatile memory 212 or another nonvolatile memory within the SCSI controller board 202. The user has the ability to select different programs stored on the controller board and to select the parameters which control the operation of the utility programs executed in the storage drive assembly. Further, the invention includes the storage of a plurality of programs which perform the same function and the user selects which of the programs is to be used. For example, if there may be a plurality of programs which perform the function of data encryption and user selects a parameter which selects which one of the data encryption and decryption programs are to be used. Further details of four different types of operations which are performed within the storage drive assembly will now be discussed with respect to the flowcharts illustrated in FIGS. 4–8.

Figure 4:
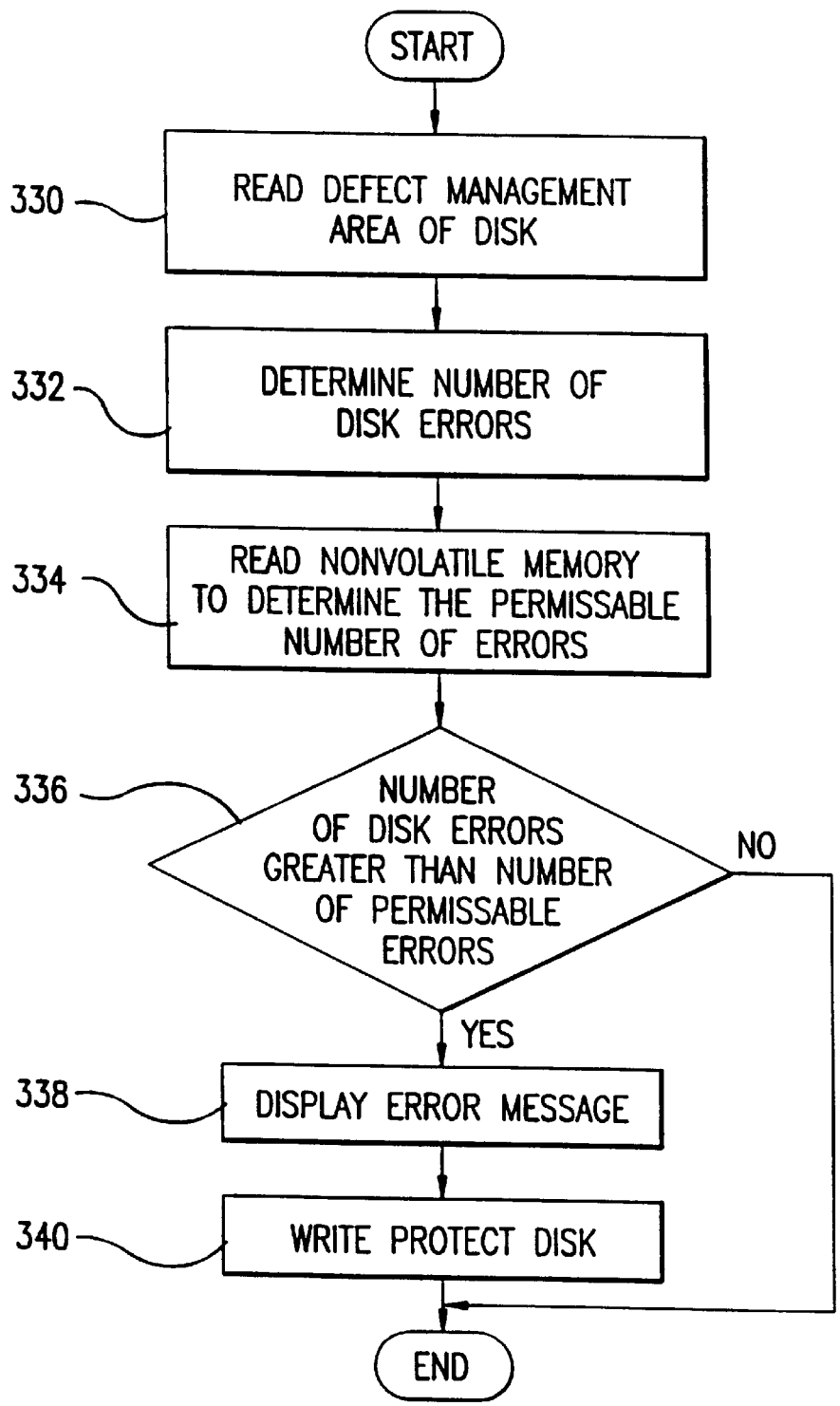
FIG. 4 illustrates a flowchart for controlling the manner in which disk errors or defects are processed within a disk drive.

FIG. 4 illustrates a flowchart for controlling the disk drive based on the errors which occur in a disk drive. Typically, a disk will have a Defect Management Area (DMA) which is used to store the location of defective sectors or defective areas of the disk. The DMA includes a Primary Defect List (PDL) which includes media defects which were determined to exist at the factory and a Secondary Defect List (SDL) which includes a list of defective areas of the disk which occur through normal use of the drive after the drive leaves the factory. The disk drive may store the defect management area twice at the innermost portion of the disk and twice at the outermost portion of the disk, resulting in the defect management area being stored four times on the disk. In the event that the defect management areas of the disk themselves reside on a defective portion of the disk, a majority rules determination can be made to determine if an area is actually defective. If the number of errors on the disk is determined to be more than a number which has been input by a user and stored in the erasable nonvolatile member 212, the disk will automatically be made write protected. While it is known in the art for a disk to be automatically made write protected after a predetermined number of errors occur, the present invention allows the user to set this number at whatever he/she desires. Currently, the ISO (International Organization for Standardization) has a recommendation for the number of errors to be 1024 before the disk is made write protected. However, with the present invention, the user can set this number as desired.

Turning now to the flowchart of FIG. 4, after starting, step 330 reads the defect management area of the disk and step 332 determines the number of disk errors. Step 334 then reads the nonvolatile memory 212 to determine the number of permissible errors which is either a default value or a number input by the user. As an example, the user may enter the number of permissible errors to be ten, after which the disk becomes write protected. If the number of disk errors is greater than the number of permissible errors which has been entered by the user, an error message is displayed to the user in step 338, the disk is made write protected in step 340, and the process ends. If in step 336 the number of disk errors does not exceed the number of permissible errors input by the user, the process ends. In an actual implementation, step 336 will be performed each time an error is defected by the disk drive.

The present invention also allows the user to select the specific types of errors which are recorded as being errors and used to control whether the disk becomes write protected or not. For example, the errors may be permanent errors which make the specific region of the disk containing the error unusable. The errors may alternatively be soft errors which are recoverable, either by repeated attempts to read or write the specific region of the disk or recoverable through error coding. The errors may alternatively be read or write errors.

Another function which can be controlled by the present invention is data encryption which takes place within the storage drive assembly itself. Different encryption algorithms may be stored within the nonvolatile memory and the user may select a parameter which controls which of the data encryption algorithms is used. Another type of data encryption parameter which may be utilized by the present invention is the known encryption concept of utilizing a "seed-"which is also referred to as "salt". A seed or salt is not a password which allows access to the disk but is more similar to a key, although it is not a key. The encryption seed or salt is used in addition to a key or password. Details of the use of the known seed or salt concept and key or password protection used with an encryption/description process are found in the book entitled "Applied Cryptography" by Bruce Schneier, 1994, which is incorporated herein by reference.

An advantage of the present invention is that not even the storage drive manufacturer will know the seed or salt as this is input by the user. This seed may be stored in the nonvolatile memory until the user desires to change the seed at a future date. Alternatively, the seed can be deleted when the power is removed from the storage drive assembly.

Figure 5:
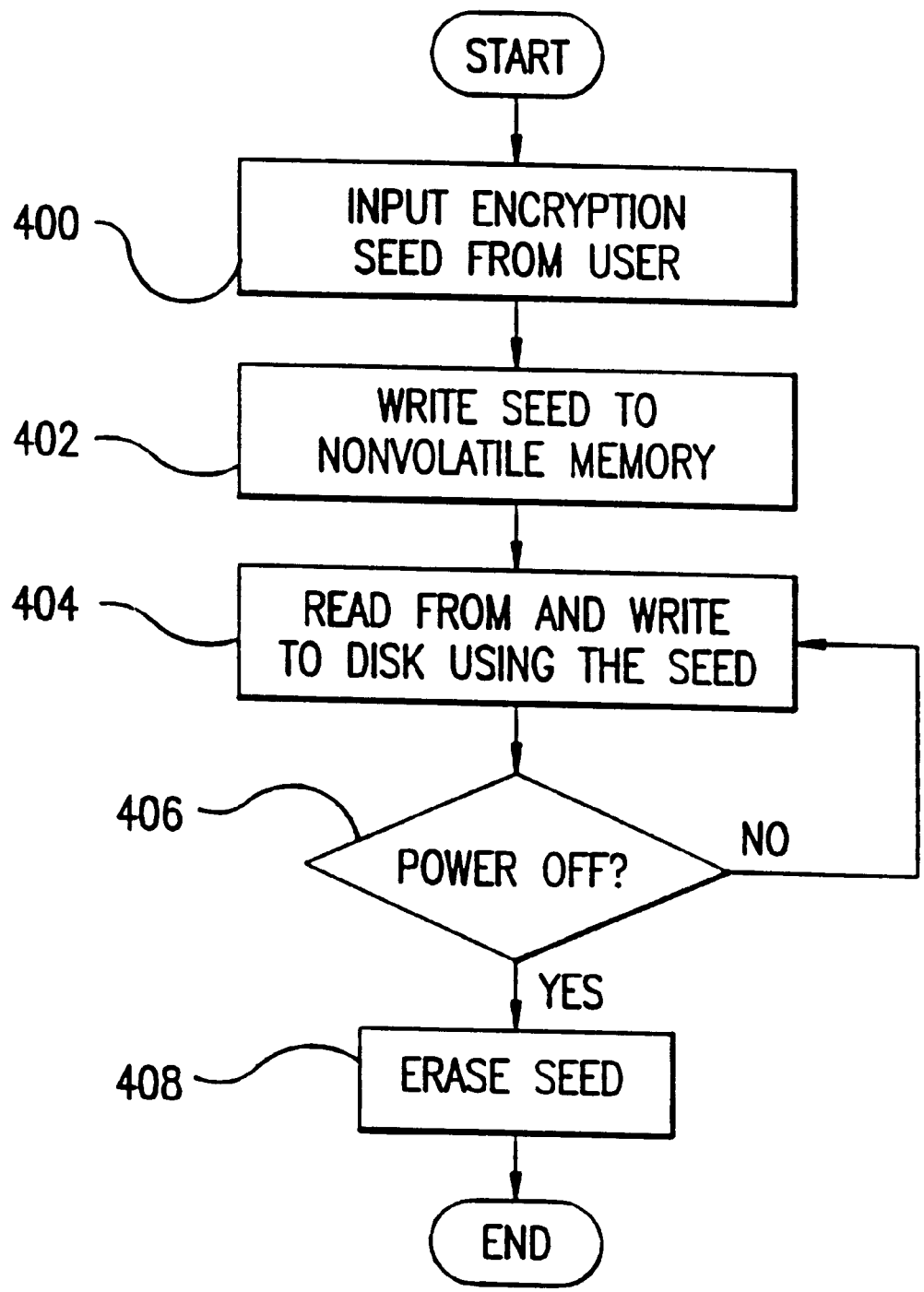
FIG. 5 illustrates a flowchart for controlling a data encryption process within the storage drive.

FIG. 5 illustrates a process which erases the seed upon removal of power from the storage drive assembly. In FIG. 5, after starting, the user inputs the encryption seed in step 400 and the seed is written to the nonvolatile memory of the storage device in step 402. The disk is written to and read from using the seed in order to properly encode and decode the information. If the power is detected as being turned off in step 406, the seed is erased in step 408. This erasing of the seed can be accomplished by generating an interrupt by a measuring circuit after the circuit determines that the voltage level drops a predetermined threshold amount below the normal operating voltage. In response to this generated interrupt, the seed stored in the nonvolatile memory can be erased by executing an appropriate routine before the voltage level within the storage drive assembly drops below an unusable value. The flowchart of FIG. 5 will require the user to input the seed each time the computer connected to the storage drive is turned on. As an alternative to storing the seed within the nonvolatile memory 212, the seed can be stored in an ordinary RAM which cannot store information after the power supply thereto is turned off.

Another parameter which may be utilized by the storage drive of the present invention is a parameter relating to the spin down of the rotation of the disk drive which reduces the consumption of power. However, a few seconds is generally needed to bring the rotational speed of the disk drive back to a usable speed. Therefore, in some instances, a user may desire to wait for a relatively long period of inactivity (e.g., forty-five minutes) before the disk drive stops spinning and in other circumstances, may desire the disk drive to stop spinning much sooner (e.g., five minutes of inactivity).

Figure 6:
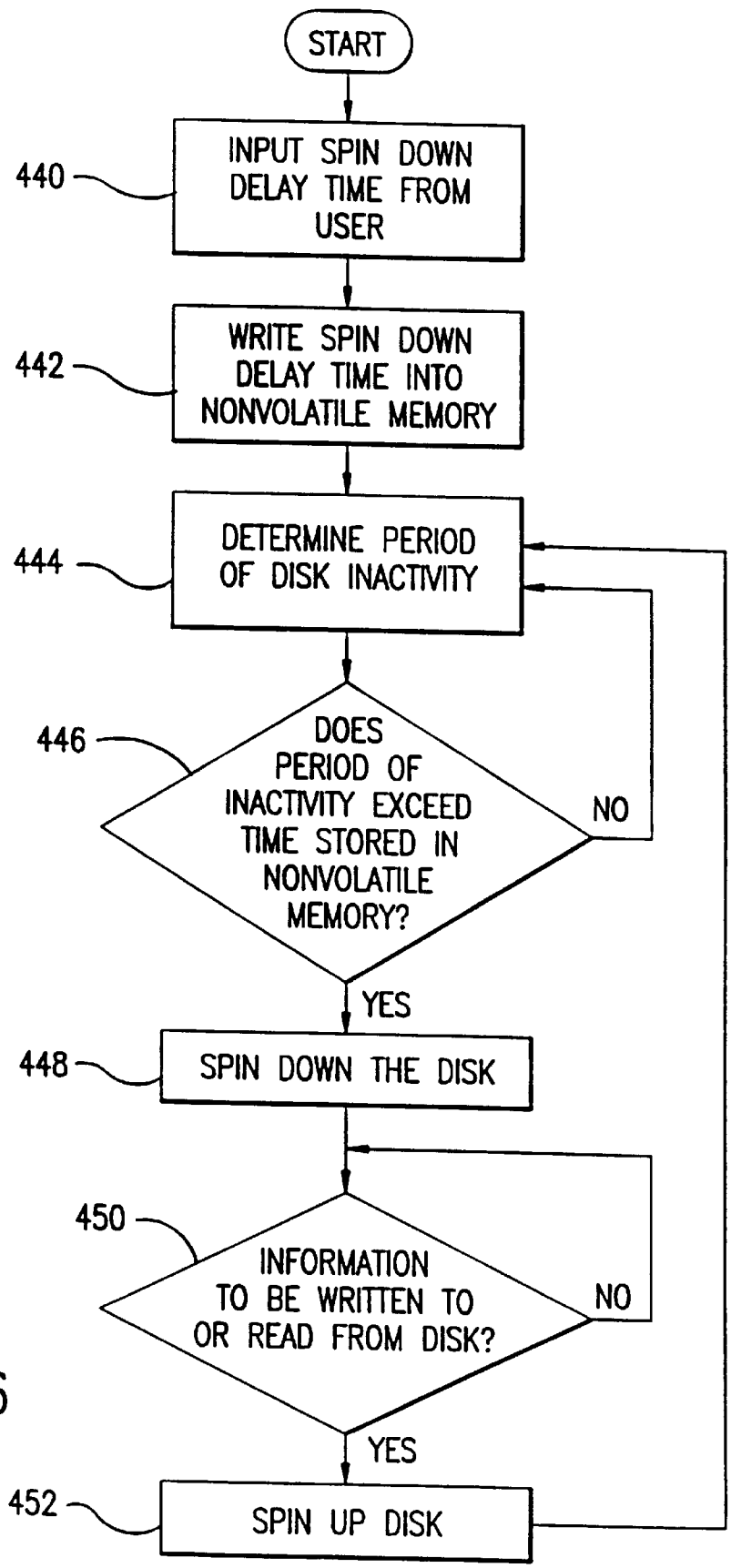
FIG. 6 illustrates a flowchart for controlling the spin down of the disk.

FIG. 6 illustrates a process used for controlling the spin down of the disk. After starting, step 440 inputs from a user a spin down delay time, after which the disk drive will stop spinning. Step 442 writes this spin down delay time into the erasable nonvolatile memory 212. Step 444 determines the time period of disk inactivity. If this period of inactivity exceeds the time stored in the nonvolatile memory, step 448 will stop the rotation of the disk. The determination of the period of inactivity is determined using a timer and/or the processing circuitry. When step 450 determines that information is to be written to the disk, step 452 spins up the disk to the necessary rotational speed and flow returns to step 444. Additionally, if step 446 does not determine that the necessary period of inactivity has passed, flow returns back to step 444 which continues to determined the period of disk inactivity.

As an alternative to the simple determination of a predetermined period of inactivity for stopping the rotation of the disk, a more complicated algorithm may be used to stop or slow the spinning of the disk drive in accordance with the disclosures of Bajorek et al, U.S. Pat. No. 5,452,277 and Buettner et al, U.S. Pat. No. 5,412,519, both of which are incorporated herein by reference. Any parameter used to control the algorithms disclosed in these two patents may be stored in the nonvolatile memory of the present invention and modified in accordance with the teachings of the present invention in order to achieve the desired rotational speed control.

Another parameter which may be controlled by the present invention pertains to the caching of the information written to or read from the disk drive. There are many known caching algorithms which may be utilized by the present invention and the caching algorithms themselves are not important to the present invention. However, the present invention does permit the manner in which the caching algorithms operate to be changed. For example if a disk drive is targeted for people who primarily work with graphics, the caching algorithm should be designed to handle large files. However, the accessing of smaller size files may suffer through the use of this algorithm. In contrast, another algorithm which is more suited for caching smaller size files may be utilized. There may be a third algorithm which is not optimal for either large or small files but provides a good intermediary between the caching algorithms used for small and large size files. The present invention allows the user to select a parameter to control which of the three different caching algorithms stored within the disk drive assembly is to be used. Further, the parameter relating to the caching algorithm will be able to set the type of buffer which is to be used within the storage drive and also the size of the buffer. For example, if the user desires a larger cache memory, the user can purchase this memory, plug in the additional memory into the storage drive, and configure, through the use of a software program within the host computer, the erasable nonvolatile memory 212 to store the size of the cache memory.

Figure 7:
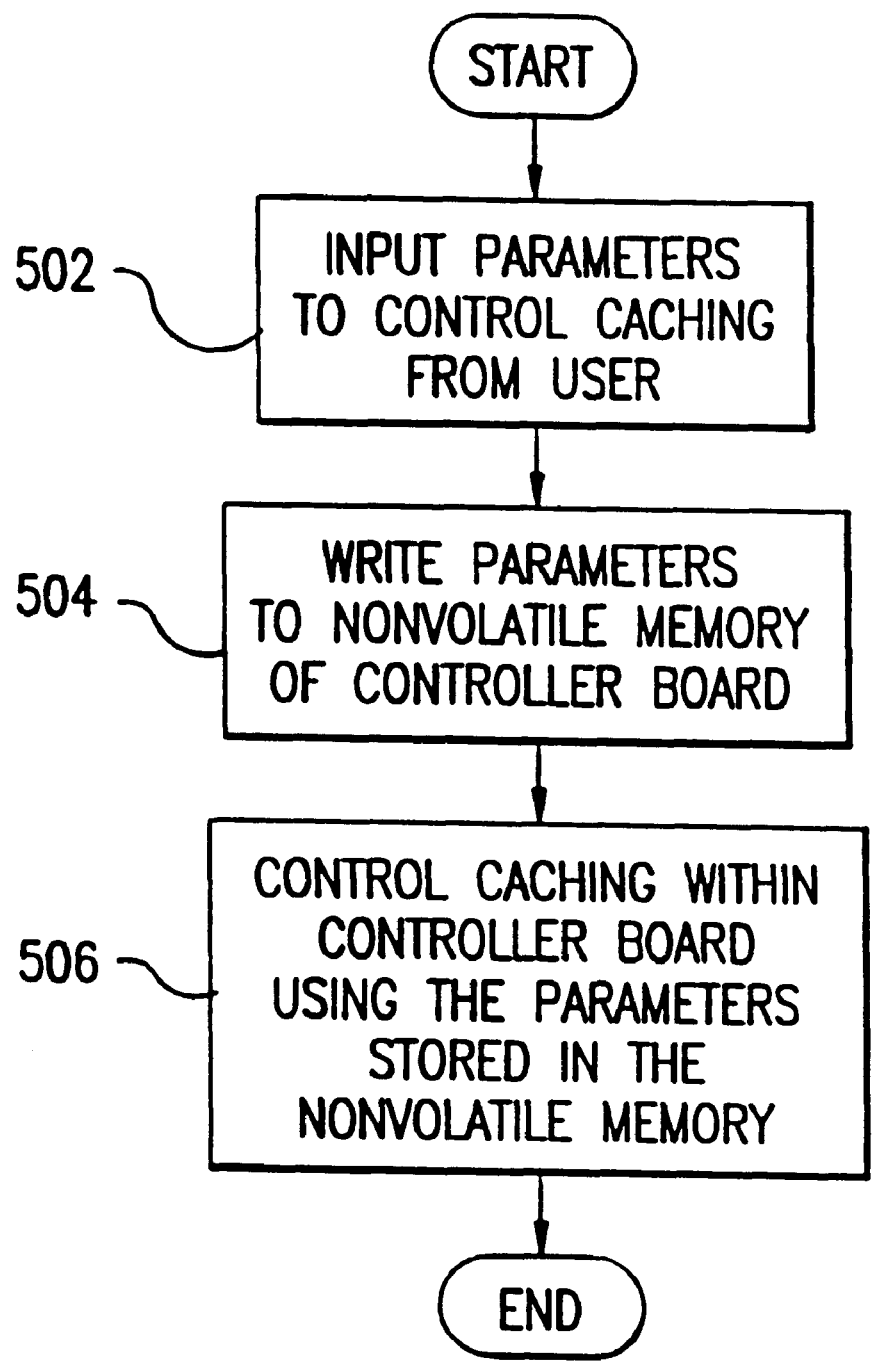
FIG. 7 illustrates a process for controlling the caching of information within the storage drive.

Turning now to the flowchart of FIG. 7, after starting, step 502 inputs the desired parameters from a user which are used to control the caching. These parameters are written to the erasable nonvolatile memory on the controller board in step 504. The caching performed on the controller board is then performed in accordance with these selected parameters which are stored in the nonvolatile memory in step 506. The process then ends.

An additional type of parameter used to control the storage drive which may be changed by the present invention pertains to the performance of data compression within the disk drive. There are known many types of data compression algorithms, and the exact details of these algorithms are not disclosed herein. The present invention allows for the storage of different data compression algorithms to be stored in the erasable non-volatile memory 212. The user can select a parameter which indicates which of the data compression algorithms are to be used. Additionally, there are parameters which are used to control the data compression algorithms such as whether or not any data compression is to be performed, and parameters relating to whether it is more important to achieve a maximum amount of data compression or to have the data compression performed in a minimum amount of time.

Figure 8:
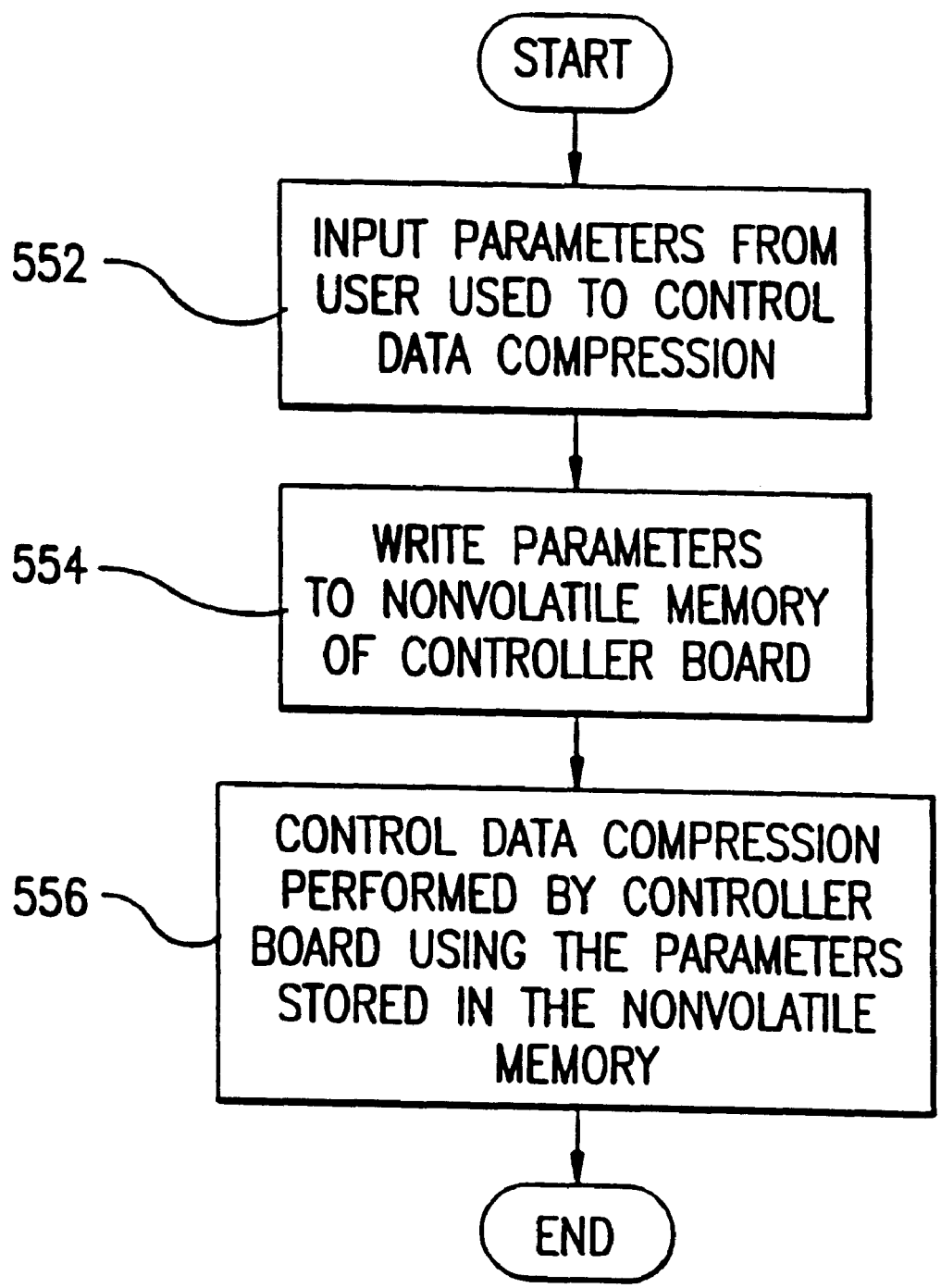
FIG. 8 illustrates a process for controlling data compression performed within the storage drive.

Referring to the flowchart illustrated in FIG. 8, after starting, step 552 inputs the desired parameters from the user which are used to control data compression. These parameters are written to the erasable non-volatile memory on the controller board in step 554. Then data is compressed and decompressed in step 556 by the controller board 202 in accordance with the compression algorithms and parameters stored in the nonvolatile memory. The process then ends.

In addition to performing compression as described above, the compression process of the present invention may be performed as disclosed in U.S. Pat. No. 5,357,614 to Pattisam et al, and U.S. Pat. No. 5,333,277 to Searls, both of which are incorporated herein reference. In this case, the invention will have the capability to alter various parameters used to control the compression process in these patents.

While the descriptions of the invention refer to a SCSI disk drive, the teachings herein are applicable to any type of interface or peripheral including IDE disk drives, peripherals which are internal or external to the host computer, tape drives, other types of hard disks, removable hard disk drives, floppy disk drives, optical disk drives, or magneto-optical disk drives. Also, the teachings of the invention are applicable to any type of computer including a Macintosh or an IBM compatible computer running any type of operating system including a Microsoft compatible DOS, Microsoft Windows, OS/2, UNIX, or any other computer running any operating system.

The invention may also be implemented utilizing the teachings of Tsuyeuguchi et al., U.S. Pat. No. 5,293,601, Hanson, U.S. Pat. No. 5,276,558, or Squires et al U.S. Pat. No. 4,979,055 which show the use of nonvolatile memories in storage drives, each of which is incorporated herein by reference.

Figure 9:
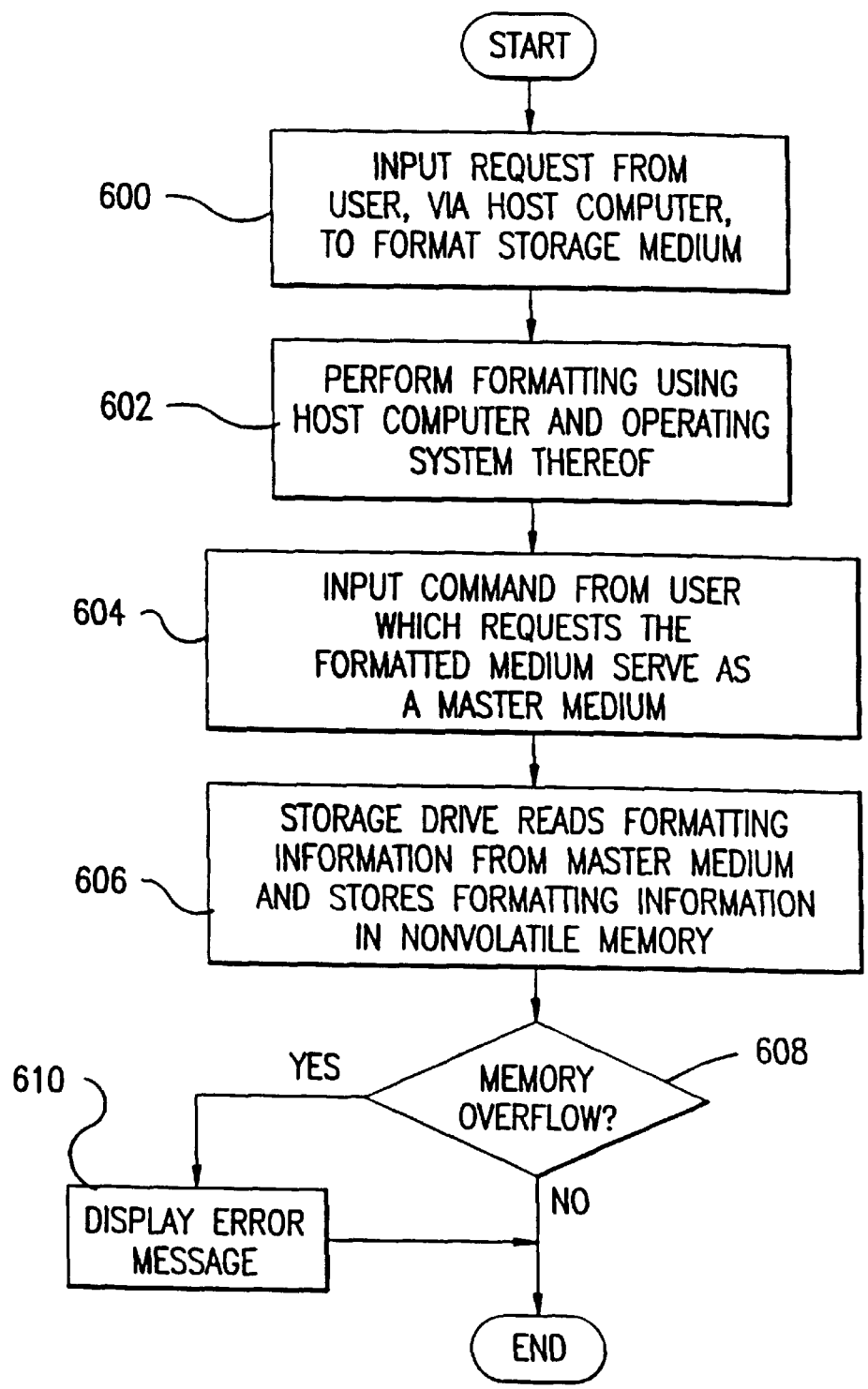
FIG. 9 illustrates a processing for determining formatting information of a storage medium and writing the formatting information to the nonvolatile memory for future use by a stand-alone formatting operation.
Figure 10:
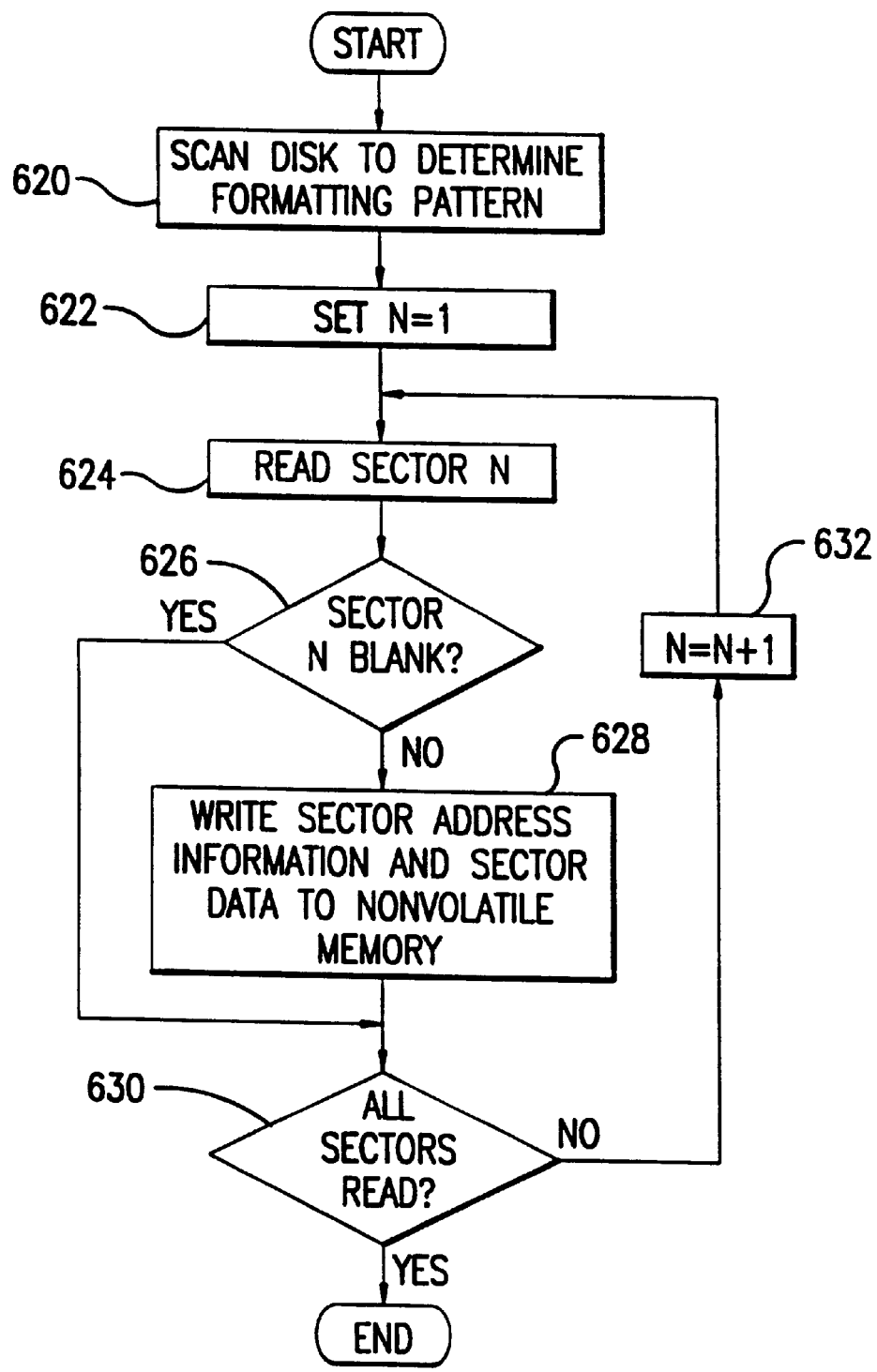
FIG. 10 illustrates a process performed by step 606 of FIG. 9 in order to determine the formatting information of the master medium and to write information of the non-blank sectors into the nonvolatile memory.
Figure 12:
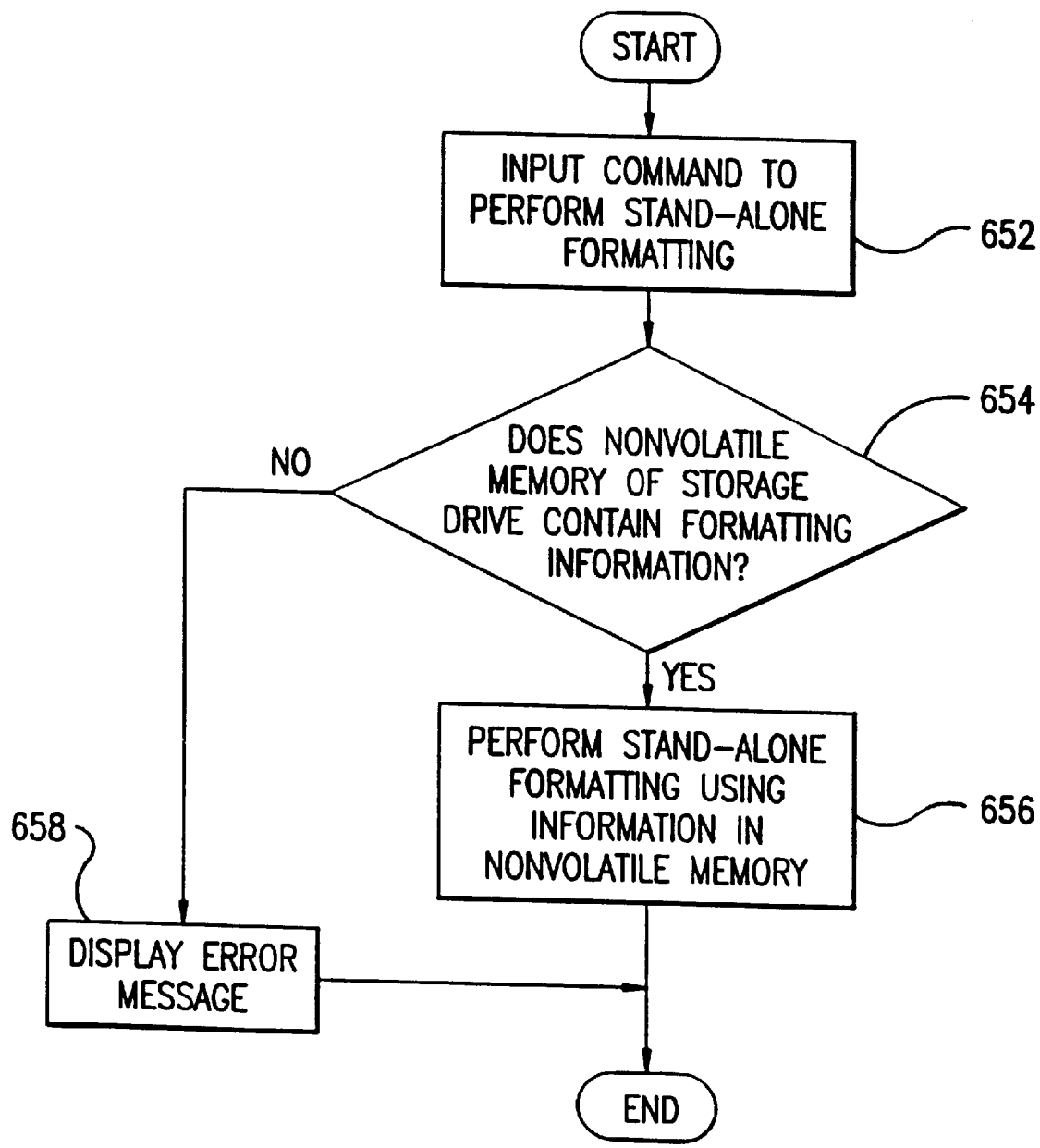
FIG. 12 illustrates a stand-alone formatting process which uses the formatting information stored in the nonvolatile memory of the storage drive.

According to another embodiment of the invention, the storage drive has the capability of performing stand-alone formatting of a storage medium within the storage drive. This formatting is performed on any type of storage medium including any type of disk, tape, or other storage medium. FIGS. 9, 10 and 12 illustrate the procedures which are performed for the stand-alone formatting.

FIG. 9 is a flowchart illustrating a process for obtaining the necessary formatting information and writing this formatting information into the nonvolatile memory of the storage drive which will be utilized in future stand-alone formatting operations. After starting, step 600 inputs a request from a user to format the storage medium. Typically, the storage medium will have already been low level formatted by the manufacturer of the storage medium and the formatting referred to in step 600 is a high level format. However, if desired or necessary, a low level formatting process will also be performed in a known manner, in accordance with the process disclosed herein, or using a process disclosed in related application Ser. No. 08/317,642. Step 602 performs the formatting process using the host computer and the information defining the formatting operation within the operating system running in the host computer. While the command to perform this formatting will ordinarily be issued from the keyboard of the host computer, it is also possible to utilize the user input/output device 204 of the storage drive assembly to command the beginning of this formatting operation. However, the information needed to perform this formatting will have to be obtained from a memory other than the erasable nonvolatile memory 212 as this memory does not yet store the necessary formatting information.

After the storage medium has been formatted, step 604 inputs a command from the user which requests the formatted medium serve as a master medium. This means that all future stand-alone formatting operations will format the new storage medium to have the same structure and information as the master medium. The information on the master medium (e.g., the non-blank sectors) will serve as information describing what a formatted medium should look like and will include the volume structure of the storage medium, the file allocation table (FAT), if appropriate, the boot sector(s) or any other information which is contained on the master medium. In step 606, the storage drive reads the formatting information from the master medium, as described above and stores this formatting information in nonvolatile memory of the storage drive.

The information which is stored in step 606 which was read from the master storage medium includes all sectors which have data therein. If the sector is a blank sector, then there is no need to store any information relating to this sector. The information is stored for example, in a matrix or other suitable data structure which stores the information on the disk and the associated sector address.

FIG. 10 illustrates the process performed by step 606 which reads the formatting information from the master medium and stores the formatting information in the nonvolatile memory 212. After starting, step 620 scans the disk to determine the formatting pattern. Initially, a disk is low level formatted, usually by the medium manufacturer and each sector begins with a formatting pattern. As an example, one formatting pattern may be "55AA" and another formatting pattern might be "6DB6." Each blank sector of the master medium will begin with this formatting pattern. Also during the low level formatting process, defects of the disk are written into the defect management area along with information of replacement sectors which are to be used in place of the sectors which are determined to be bad sectors. When performing step 620 to scan the disk to determine the formatting pattern, a predetermined number of sectors are read across the disk such as at the beginning of the disk, middle of the disk, and end of the disk to determine what the formatting pattern is. A sufficiently large number of sectors must be read in order to determine the formatting pattern which is associated with the blank sectors. As an example, 100–300 sectors may be read.

After the formatting pattern is determined in step 620, step 622 sets the variable N equal to one. Step 624 then reads sector N and step 626 determines if this sector is blank. If the sector is blank, it will contain the formatting pattern which was determined in step 620. There is no need to store information of this blank sector because the second medium which is to be later formatted using the master medium will already be low level formatted and have the blank sectors begin with the formatting pattern. If the sector is determined not to be blank, step 628 writes information pertaining to this sector address and the data which is within this sector to the nonvolatile memory 212. Step 630 determines if all sectors have been read and if they have not, N is incremented by one in step 632 and the process of step 624–630 repeats. If all sectors have been determined to be read in step 630, the process of FIG. 10 ends which is the end of step 606 of FIG. 9.

Figure 11A:
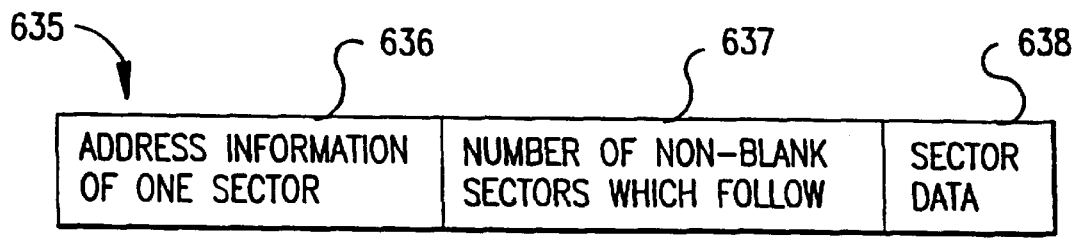
FIG. 11A illustrates a data structure used for storing, in a nonvolatile memory of the storage drive, the information of non-blank sectors.

As a concern with the present invention is to store the information as efficiently as possible into the nonvolatile memory, the inventor has developed a data structure which allows an efficient storing of information. This data structure is illustrated in FIG. 11A. The data structure designated by 635 includes a field 636 for storing address information of one sector, a field 637 for storing the number of non-blank sectors which follow the sector stored in 636, and a field 638 which stores the sector data of the run of non-blank sectors whose addresses correspond with the address information in the fields 636 and 637. The term field is synonymous with the term "data object" of a data structure. The address information for the sectors is usually stored as a Logical Block Address ("LBA") or a sector number. The field 637 must always contain a number so that if there is only one sector which contains data, field 637 will contain the number zero. The sector data is the data for the consecutive sectors. The actual disk data corresponding to the sectors described by the fields 636 and 637 is grouped together into the sector data field 638. This sector data may be later associated with the individual sectors by knowing the sector length which is the same for each sector and usually stored in a header of the storage medium or can be determined in other known ways.

As non-blank sectors will usually appear in groups on the master medium, the present invention provides an efficient manner for reducing the storage space necessary to store the address information of the non-blank sectors. Every time there is an individual non-blank sector or a group of consecutive non-blank sectors of a disk, a data structure 635 is used to store the information for the individual non-blank sector or the consecutive non-blank sectors. Therefore, a plurality of data structures 635 will usually be created for each master storage medium.

Figure 11B:
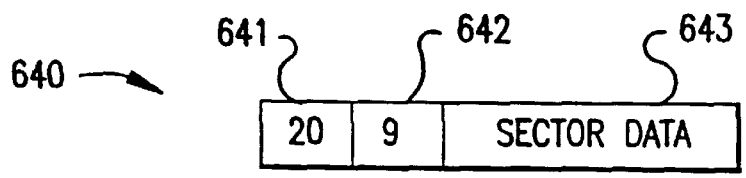
FIG. 11B illustrates a data structure which stores information indicating that sector number twenty is a non-blank sector and nine non-blank sectors follow sector twenty, along with the sector data.

A first exemplary data structure is illustrated in FIG. 11B. In this data structure 640, the first field 641 stores the logical block address twenty, indicating that the first non-blank sector associated with this data structure has a logical block address of twenty. Field 642 stores the number nine, indicating nine sectors follow sector twenty which are non-blank. Field 643 stores the sector data of sectors twenty through twenty-nine.

Figure 11C:
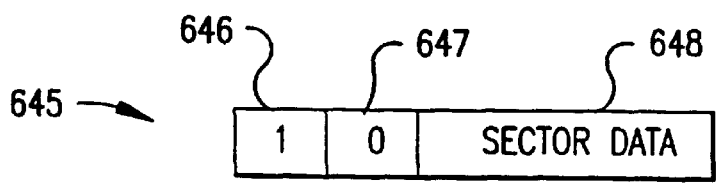
FIG. 11C illustrates a data structure which stores information indicating that sector number one is a non-blank sector and no non-blank sectors follow, along with the sector data for sector number one.

FIG. 11C illustrates a data structure 645 which stores data for sector number one. Field 647 is zero, indicating that there is only the one sector, sector number one, which contains data. Field 648 contains the data for this sector. Alternative data structures may used in place of the data structures illustrated in FIGS. 11A–11C, as desired.

A concern with the writing of information into the nonvolatile memory in step 606 is that as it is common to have removable storage media with storage capabilities of 100 megabytes or more, there may be more information which needs to be written in the nonvolatile semiconductor memory than this nonvolatile memory is capable of storing. Therefore, step 608 of FIG. 9 detects if there has been a memory overflow and if an overflow is determined to exist, step 610 displays an error message to the user, either using the display on the storage drive or through the display of the host computer which indicates that there is more information which needs to be stored for the formatting operation then the nonvolatile memory is capable of storing. The process of FIG. 9 then ends.

FIG. 12 illustrates the process of performing the stand-alone formatting after the necessary formatting information has been obtained and stored using the process illustrated in FIGS. 9 and 10. In FIG. 12, step 652 inputs a command indicating that a stand-alone formatting operation is to be performed. One manner in which this command may be input is by a user simultaneously pressing two buttons which are part of the user input/output device 204 simultaneously for a predetermined period of time such as five seconds. It is important for the command to begin the stand-alone formatting process to not allow the user to accidentally perform the formatting operation because if the formatting operation begins while there is information on the storage medium, this information will be erased by the formatting process. In addition to commanding the stand-alone formatting operation to begin using the two buttons as described above, any desired manner of beginning the stand-alone formatting process can be used including using various buttons, or switches or other input device on the storage drive itself or through a command from the host computer which indicates that the stand-alone formatting process is to be performed.

After receiving the command to begin stand-alone formatting in step 652, step 654 determines if formatting information is contained within the nonvolatile memory. If the formatting information does exist, step 656 performs the stand-alone formatting using the information within the nonvolatile memory previously obtained from the master storage medium. If the formatting information is determined not to exist in the nonvolatile memory, step 658 displays an error message to the user, indicating the necessary formatting information does not exist. If desired, the system will automatically give the user an option to perform formatting using information stored within the host computer. The process of FIG. 12 then ends.

If the master medium such as a master disk is a bootable disk, when the master disk is read to determine the necessary formatting information which is stored in the nonvolatile memory, the operating system within the master disk will also be read and stored within the nonvolatile memory. Consequently, when a stand-alone formatting operation is performed, the new disk which is formatted will have the operating system written thereto. However, as the operating system may require a large amount of storage space, the size of the nonvolatile memory will have to be large enough to store all necessary information including the operating system.

The stand-alone formatting operation may be performed for a plurality of types of storage media. For example, the invention may be usable with different sizes or different types of storage media and the necessary formatting information for each of the different types of formatting media will be stored within the nonvolatile memory. The unformatted storage media will either have a header indicating the features or type of the storage medium, or the storage drive will read some other portion of the storage medium to determine the type of the storage medium in order to subsequently determine if there is matching formatting information stored within the nonvolatile memory. If the storage medium to be formatted is of a type different from the types stored within the nonvolatile memory, a message will be displayed to the user indicating that the stand-alone formatting cannot be performed at the present time. However, the user will be able to perform a normal formatting operation using the host computer and the newly formatted storage medium can be used as a new master storage medium so that future stand-alone processes for this type of medium can be done.

The manner of performing stand-alone formatting in accordance with the present invention provides the storage drive manufacturer with a simple manner of eliminating the need to upgrade the control program information used for the stand-alone formatting. As the user himself provides the formatting information by the indication of a master storage medium, when new storage medium formats are developed, the user himself will add to or reprogram the nonvolatile memory to contain the necessary information without the need to request any type of upgrade from the storage drive manufacturer. As an example, if the present invention were utilized to perform formatting according to a Microsoft DOS 5.x or 6.x format and the user desire to upgrade to a Windows 95 format, there would be no need to obtain an upgrade from the drive manufacturer but by inserting a suitable master storage medium into the storage drive, the necessary formatting information could be determined and utilized for future stand-alone formatting operations.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for controlling a storage device having a storage medium and a nonvolatile memory, different from the storage medium, comprising the steps of:

inputting, using a computer connected to the storage device, a parameter from a user which changes an operation of a control program stored in the storage device;

writing the parameter into the nonvolatile memory of the storage device; and controlling an operation of the storage device and the storage medium thereof which is different from the nonvolatile memory using the parameter stored in the nonvolatile memory and the control program.

2. A method according to claim 1, wherein the step of writing the parameter into the nonvolatile memory changes a default parameter stored in the nonvolatile memory.

3. A method according to claim 1, wherein the step of writing the parameter into the nonvolatile memory writes the parameter into a memory selected from the group consisting of a flash memory, an EPROM, an EEPROM, and a CMOS RAM.

4. A method according to claim 1, wherein the step of writing the parameter is performed without changing the control program.

5. A method according to claim 1, wherein the step of inputting a parameter inputs a parameter which indicates whether a utility algorithm is to be executed.

6. A method according to claim 1, wherein the step of inputting a parameter inputs a parameter which indicates which one of a plurality of utilities, each performing a same function, is to be executed.

7. A method according to claim 1, wherein the step of controlling the operation of the storage device controls the operation of a storage device selected from the group including a disk drive and a tape drive.

8. A method according to claim 1, wherein said controlling step comprises:

controlling the operation of the storage device using the control program which is stored in said nonvolatile memory.

9. A method for controlling a storage device having a nonvolatile memory, comprising the steps of:

inputting, using a computer connected to the storage device, a parameter from a user which changes an operation of a control program stored in the storage device;

writing the parameter into the nonvolatile memory of the storage device; and controlling an operation of the storage device using the parameter stored in the nonvolatile memory and the control program, wherein the step of inputting the parameter inputs a parameter for controlling how errors are processed within the storage device.

10. A method according to claim 9, wherein the step of inputting the parameter inputs a parameter for controlling how many errors need to occur before performing a step of write protecting a storage medium within the storage device.

11. A method for controlling a storage device having a nonvolatile memory, comprising the steps of:

inputting, using a computer connected to the storage device, a parameter from a user which changes an operation of a control program stored in the storage device;

writing the parameter into the nonvolatile memory of the storage device; and controlling an operation of the storage device using the parameter stored in the nonvolatile memory and the control program, wherein the step of inputting the parameter inputs a parameter for controlling how data is encrypted and decrypted within the storage device.

12. A method according to claim 11, wherein the step of inputting the parameter inputs an encryption seed.

13. A method according to claim 12, further comprising the step of:

deleting the encryption seed from the nonvolatile memory upon removing power from the storage device.

14. A method for controlling a storage device having a nonvolatile memory, comprising the steps of:

inputting, using a computer connected to the storage device, a parameter from a user which changes an operation of a control program stored in the storage device;

writing the parameter into the nonvolatile memory of the storage device; and controlling an operation of the storage device using the parameter stored in the nonvolatile memory and the control program, wherein the step of inputting the parameter inputs a parameter for controlling a spin down process of the storage device.

15. A method according to claim 14, wherein:

the step of inputting the parameter inputs a time delay used for controlling the spin down process; and the step of controlling the operation of the storage device spin downs the storage device after a predetermined period of time, which corresponds to the parameter, passes without information being written to or read from the storage device.

16. A method for controlling a storage device having a nonvolatile memory, comprising the steps of:

inputting, using a computer connected to the storage device, a parameter from a user which changes an operation of a control program stored in the storage device;

writing the parameter into the nonvolatile memory of the storage device; and controlling an operation of the storage device using the parameter stored in the nonvolatile memory and the control program, wherein:

the step of inputting the parameter inputs a parameter for controlling a caching of information in the storage drive, and the step of controlling the operation of the storage device controls a caching of information in the storage device.

17. A method according to claim 16, wherein the step of inputting the parameter inputs a parameter indicating which of a plurality of caching algorithms is to be executed.

18. A method for controlling a storage device having a nonvolatile memory, comprising the steps of:

inputting, using a computer connected to the storage device, a parameter from a user which changes an operation of a control program stored in the storage device;

writing the parameter into the nonvolatile memory of the storage device; and controlling an operation of the storage device using the parameter stored in the nonvolatile memory and the control program, wherein:

the step of inputting the parameter inputs a parameter for controlling a compression of information in the storage drive; and the step of controlling the operation of the storage device controls a compression of information in the storage device.

19. A method according to claim 18, wherein the step of inputting the parameter inputs a parameter indicating which of a plurality of compression algorithms is to be executed.

20. A method according to claim 18, wherein the step of inputting the parameter inputs a parameter indicating whether the compression of information should be performed with an object of maximum data compression or minimum compression time.

21. A storage device for use with a computer, comprising:

a storage medium;

a memory for storing a control program which controls an operation of the storage device;

a nonvolatile memory, different from said storage medium, for storing a parameter, altered by a user by interaction with the computer, which controls the operation of the control program; and processing circuitry for executing the control program to control the operation of the storage device using the parameter.

22. A storage device according to claim 21, wherein:

the memory for storing the control program is said nonvolatile memory.

23. A storage device according to claim 21, wherein the nonvolatile memory stores a default parameter before said parameter is altered by the user.

24. A storage device according to claim 21, wherein the-nonvolatile memory is selected from the group consisting of a flash memory, an EPROM, an EEPROM, and a CMOS RAM.

25. A storage device according to claim 21, further comprising:

means for writing the parameter into the nonvolatile memory without changing the control program.

26. A storage device according to claim 21, wherein the parameter stored in the nonvolatile memory controls whether a utility algorithm is to be executed by the processing circuitry.

27. A storage device according to claim 21, wherein the parameter stored in the nonvolatile memory controls which one of a plurality of utilities, each performing a same function, is to be executed by the processing circuitry.

28. A storage device according to claim 21, wherein the storage device is selected from the group including a disk drive and a tape drive.

29. A storage device according to claim 21, wherein the parameter stored in the nonvolatile memory controls how errors are processed within the storage device.

30. A storage device according to claim 29, wherein the parameter stored in the nonvolatile memory controls how many errors need to occur before the processing circuitry write protects the storage medium.

31. A storage device according to claim 21, wherein the parameter stored in the nonvolatile memory controls how data is encrypted and decrypted within the storage device by the processing circuitry.

32. A storage device according to claim 31, wherein the parameter stored in the nonvolatile memory is an encryption seed.

33. A storage device according to claim 32, further comprising:

circuitry for deleting the encryption seed from the nonvolatile memory upon removing power from the storage device.

34. A storage device according to claim 21, wherein the nonvolatile memory stores a parameter for controlling a spin down process of the storage device performed by the processing circuitry using the control program and the parameter.

35. A storage device according to claim 34, wherein:

the nonvolatile memory stores a parameter which is a time delay used for controlling the spin down process; and the processing circuitry controls the operation of the storage device spin downs the storage device after a predetermined period of time, which corresponds to the parameter, passes without information being written to or read from the storage medium.

36. A storage device according to claim 21, wherein:

the nonvolatile memory stores a parameter for controlling a caching of information in the storage drive, and the processing circuitry controls a caching of information in the storage device.

37. A storage device according to claim 36, wherein the nonvolatile memory stores a parameter for controlling which of a plurality of caching algorithms, stored in the memory for storing the control program, is to be executed.

38. A storage device according to claim 36, wherein:

the nonvolatile memory stores a parameter for controlling a compression of information in the storage drive; and the processing circuitry controls a compression of information in the storage device using the parameter.

39. A storage device according to claim 38, wherein the nonvolatile memory stores a parameter for controlling which of a plurality of compression algorithms is to be executed.

40. A storage device according to claim 38, wherein the nonvolatile memory stores a parameter for controlling whether the compression of information should be performed with an object of maximum data compression or minimum compression time.

* * * * *